Nov. 21, 1950   R. M. FRANZEL   2,531,265
ELECTRONIC APPARATUS
Filed Aug. 21, 1944
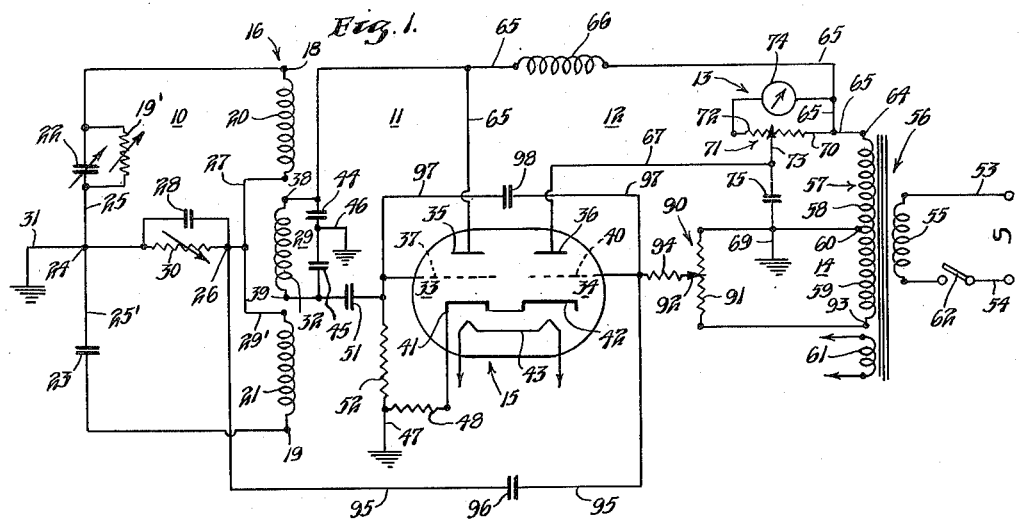
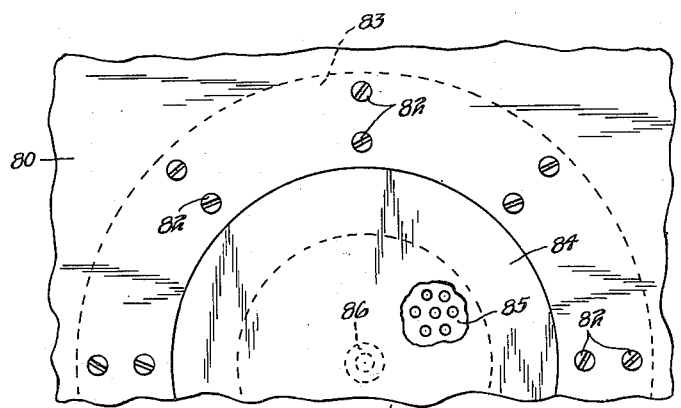
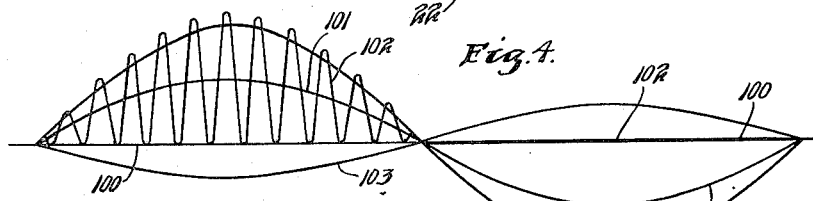
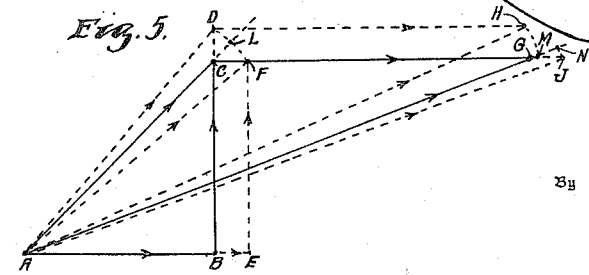
Inventor
RICHARD M. FRANZEL
By
George H. Fisher
Attorney Patented Nov. 21, 1950

2,531,265

UNITED STATES PATENT OFFICE 2,531,265

ELECTRONIC APPARATUS

Richard M. Franzel, Minneapolis, Minn., assignor to Minneapolis-Honeywell Regulator Company, Minneapolis, Minn., a corporation of Delaware Application August 21, 1944, Serial No. 550,373

7 Claims. (Cl. 250—27)

This invention relates to the field of aeronautical electronic engineering and more particularly to the portion of that field having to do with the detection, removal and prevention of accretion of ice on airfoil surfaces, such, for example, as wing and tail surfaces of aircraft.

My invention comprises refinements of and improvements on the circuits disclosed in the copending application of Waldo H. Kliever, Serial No. 463,259, now matured into U. S. Patent No. 2,432,669, and in my copending joint application with Waldo H. Kliever, Serial No. 463,260, now matured into U. S. Patent No. 2,419,266, both filed October 24, 1942. In these earlier applications the problem of ice indication and removal is discussed at some length, and pickup means and circuit arrangements are disclosed which are particularly adapted for use in indicating the presence of ice, or in energizing means for removing it, or in performing both these functions.

The conventional supply of electrical energy in the modern aircraft is a 400 cycle alternator. The previous circuits above mentioned were designed for energization from a unidirectional source such, for example, as batteries, and the weight of economically practical batteries, as well as their bulk, has been found to exceed the weight and bulk of all the rest of my system. This is a serious disadvantage in aircraft use, where both weight and bulk must be reduced to an absolute minimum. It is of course possible to include in the housing of the prior ice indicator amplifier a conventional power supply to electronically rectify the 400 cycle current and obtain substantially continuous current therefrom, but this again results in greater weight and size than are required simply for the system per se, as well as further complicating the circuit and increasing the number of components.

My present invention makes it possible to operate an ice responsive system of the type referred to directly from a source of alternating voltage, eliminating the need for batteries, dynamotors, vibrator packs, rectifiers, filters and similar expedients. This I accomplish, as fully set forth below, without losing the advantages of employing a capacity pickup in a high frequency bridge or the advantages of the "phased detection" circuit developed for discriminating against nonlinear effects of ice accretion.

It is accordingly an object of my invention to provide a new and improved icing indicator for aircraft and analogous applications.

It is another object of my invention to provide an electrical circuit including an oscillator and an amplifier, each of which may be electrically energized solely from an alternating source.

It is yet another object of my invention to provide an improved condition responsive electrical network which may be energized solely from an alternating source.

It is a still further object of my invention to provide a condition responsive network which may be energized solely from a source of alternating electrical energy, and in which the magnitude of the electrical output of the network is determined largely by one of the electrical responses of a condition responsive member, another of the responses, even though of the same order of magnitude, being of slight relative effect upon the output of my system.

Various other objects, advantages and features of novelty which characterize my invention are pointed out with particularity in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention. In the drawing:

Figure 1 is a schematic representation of a circuit embodying my invention,

Figure 2 is a sectional view of a physical embodiment of a capacity pickup which I prefer to use and which is discussed at great length in the application first referred to above, Figure 3 is a partial plan view of the device shown in section in Figure 2, Figure 4 is a graph illustrative of certain voltage relations in the operation of my invention, and Figure 5 is a vector diagram also illustrative of certain voltage relations in the operation of my invention.

For the purpose of illustration, the circuit comprising my invention is herein described as applied in an ice indicator, and with a pick-up unit, as disclosed in the above mentioned copending application. It will be understood, however, that my circuit is applicable generally, and that the balance of the impedance bridge may be varied in many other ways than by the formation of ice upon a pick-up unit. It is also pointed out that the balance of the impedance bridge may be varied not only by varying the capacity of one of the condensers but also by varying the inductance of one of the inductance coils.

Referring now to Figure 1 of my drawing, disclosing my system as a whole, it will be seen that the system comprises an electrical bridge 10, an electronic oscillator 11, an electronic mixer-amplifier 12, an indicator circuit 13, and a power supply circuit 14. An electron discharge device 15 is common to oscillator 11 and mixer-amplifier 12, while a transformer 16 is common to bridge 10 and oscillator 11.

Bridge 10 is shown to comprise a pair of inductors 20 and 21 and a pair of capacitors 22 and 23, the inductors and capacitors being respectively located in adjacent pairs of arms of bridge 10. Capacitor 22 is indicated as being of variable capacitance, and preferably takes the form of my improved capacity pickup for indicating ice accretion, more clearly shown in Figures 2 and 3. Under icing conditions, capacitor 22 is found to have leakage resistance as indicated by the parallel resistor 19' in Figure 1, while capacitor 23 is substantially free from leakage. Capacitors 22 and 23 are connected to an output terminal 24 of bridge 10, by conductors 25 and 25'. Inductors 20 and 21 are connected to an output terminal 26 of bridge 10, by conductors 27 and 29'. The bridge is inductively energized as will be presently described, hence terminal 18 of inductor 20 and a terminal 19 of inductor 21 may be considered the input terminals of bridge 10. A load resistor 30 is connected between terminals 26 and 24, the latter of which is grounded as at 31. This resistor may be made variable as disclosed, and a capacitor 28 may be connected in parallel therewith, to provide a phase shifting network for the bridge output voltage, if this is desired.

Inductors 20 and 21 comprise the secondary winding of transformer 16, the transformer being provided with a primary winding 32 and having an air core. Primary winding 32 is energized at terminals 38 and 39 with the high frequency alternating voltage in oscillator circuit 11 of which it forms a part.

Electron discharge device 15 is shown to comprise a pair of triodes 33 and 34 including respectively plates 35 and 36, control grids 37 and 40, cathodes 41 and 42, as well as a common cathode heater 43. Cathodes 41 and 42 are grounded as at 47 through a biasing resistor 48. It will be appreciated that if it is desired a pair of single triode tubes may be substituted for this twin triode tube, or that if the user desires the added known advantages and complications of tetrodes or pentodes these devices may be substituted in conventional fashion for the triodes herein disclosed.

With the exception of the alternating power supply, which will be discussed presently, oscillator 11 is a conventional Colpitts circuit. Primary winding 32 of transformer 16 comprises the inductance in the tank circuit 29 of this oscillator, and the frequency of the oscillations is fixed at a value depending on the relationship between the inductance of coil 32 and the joint capacitance of a pair of capacitors 44 and 45. The feedback in this circuit is also fixed and is determined in magnitude with respect to the total high frequency voltage of the oscillator by the relationship between the individual impedances of inductor 32 and capacitors 44 and 45, the latter having a common terminal connected to cathode through ground connections 46 and 47 and resistor 48. The actual feedback voltage is the voltage drop across capacitor 45, and it is impressed between grid 37 and cathode 41 of triode 33 through a coupling capacitor 51, a grid resistor 52, and the ground circuit just traced.

The source of electrical energy for electron discharge device 15 will now be described. Electrical energy is made available from any convenient source of alternating voltage of a selected power frequency, for example, 400 cycles per second, by conductors 53 and 54, and is led through a switch 62 to the primary winding 55 of a transformer 56 having a secondary winding 57 with an intermediate tap 60 and end terminals 64 and 93. A second secondary winding 61 is provided for energizing heater filament 43.

Winding 57 is divided at terminal 60 into a plate energizing portion 58 and a grid bias portion 59. Plate potential for anodes 35 and 36 of electron discharge device 15 is obtained between terminal 64 and tap 60 of winding 57, the tap being grounded as at 69. Plate 35 of triode 33 is connected with terminal 64 by conductor 65 which includes a radio frequency choke 66 so that high frequency oscillations from oscillator 11 will not be short circuited to cathode 41 through winding 57, ground connections 69 and 47, and resistor 48.

Anode 36 of triode 34 is connected to terminal 64 of winding 57 through conductors 67 and 65 and a variable portion of a resistor 71 comprising a winding 72 and a movable contact 73. A direct current milliammeter 74 is connected across winding 72, which accordingly forms a sensitivity adjustment for the meter. A by-pass condenser 75 is provided to keep any stray radio frequency currents which may be in the plate circuit of triode 34 out of the measuring network.

A potential divider 90 having a winding 91 and a sliding contact 92 is connected between tap 60 and lower terminal 93 of secondary winding 57. Sliding contact 92 is connected by resistor 94 with grid 40 of triode 34, while cathode 42 of triode 34 is connected to tap 60 by ground connections 69 and 47 and resistor 48. Adjustment of sliding contact 92 therefore varies the amplitude of an alternating bias voltage impressed between the grid and cathodes of triode 34 at the frequency of the power source.

In addition to this bias potential, two signal voltages are impressed between grid 40 and ground. One of these is derived from the bridge output voltage, and is transmitted from terminals 24 and 26 through ground connections 31 and 47 and through conductor 95, the latter including coupling capacitor 96 which also acts to block passage of appreciable low frequency signal from potential divider 90 to bridge 10. The other is derived from the oscillator feedback voltage, and is transmitted from the terminals of capacitor 45 through ground connections 46 and 47 and through capacitor 51 and conductor 97, the latter including coupling capacitor 98 which also acts to block passage of appreciable low frequency signal from potential divider 90 to the grid 37 of the oscillator.

Before discussing the operation of my system,

I will briefly describe the construction of a preferred embodiment of condition responsive condenser pick-up 22. This structure is shown in Figures 2 and 3, which are generally the same as figures in the first of the above mentioned copending applications, and while it does not form a principal portion of the invention in the present application, I am describing it for the sake of completeness. The pick-up is arranged for cooperation with a leading edge 80 of an airfoil surface such as a wing; this surface is normally grounded, as is indicated at 81, and forms the first electrode of capacitor 22.

Fastened to surface 80 by any convenient method, as for instance by screws 82 and clamping ring 83, is a member 84 of insulating material, having embedded in its central portion a metallic disk 85 carrying a threaded stud 86 for making electrical connection therewith. I prefer to construct my pick-up generally concentric about the axis of stud 86, but this device can be constructed in square or rectangular form or of irregular outline according to the necessities or desires of the user. The central disk 85 ocmprises the second electrode of capacitor 22: the two electrodes 80 and 85 are physically in edge to edge relationship.

The electrostatic field between plate 85 and surface 80 includes as its dielectric the member 84 and the air on each side of it. If ice forms on the outer or convex side of the pick-up unit, ice as a dielectric replaces air as a dielectric. This increases the average dielectric constant, and therefore the capacitance of the capacitor, whose reactance consequently decreases as the accretion of ice increases.

In addition to the electrostatic field surrounding disk 85, there is a high resistance leakage path through member 84, and the formation of ice on the pick-up adds to this leakage path by the provision of more semi-conductor area between the two plates, thus constituting variable resistor 19 as shown in Figure 1. In the lower portion of Figure 2 I have indicated an accretion of ice by reference numeral 87, and have shown in curved lines how the electrostatic field between the plates traverses member 84, ice 87, and the air. The increased conducting area between disk 85 and the surface 80 is also clearly shown in this figure.

There is another phenomenon which cannot be illustrated in the drawing but which is of significance in the successful operation of my device. The capacitance between disk 85 and surface 80 varies in a nearly linear fashion with accretion of ice on the pick-up and is little influenced by temperature variations. The conductance of the leakage path, however, varies with accretion of ice in a non-linear fashion, and is markedly influenced by temperature variation.

The impedance of the pick-up is comprised of its capacitance and its resistance, and since the capacitance varies in a manner more adaptable to measurement of ice accretion independent of temperature variations, I have found it desirable to so arrange my circuit as to render minimal the influence of the resistive component of the change in impedance, thus minimizing the effect of temperature variation on the system and making its operation substantially linear with changes in ice thickness.

While my invention is in no way limited to an arrangement employing elements having any particular values, one satisfactory embodiment of my invention is comprised of components having the following electrical characteristics:

| Component | Value |
|---|---|
| Capacitor 22 | 50 micro-microfarads |
| Capacitor 23 | 50 micro-microfarads |
| Capacitor 28 | .0001 micro-farad |
| Capacitor 44 | .0001 micro-farad |
| Capacitor 45 | .0001 micro-farad |
| Capacitor 51 | .0001 micro-farad |
| Capacitor 96 | 5 micro-microfarads |
| Capacitor 98 | 10 micro-microfarads |
| Capacitor 75 | .001 microfarads |
| Resistor 30 | .5 megohm |
| Resistor 52 | .15 megohm |
| Resistor 48 | .5 megohm |
| Resistor 94 | .5 megohm |
| Potential divider 71 | 10,000 ohms |
| Potential divider 90 | 2,000 ohms |
| Inductor 20 | 52 millihenries |
| Inductor 21 | 52 millihenries |
| Inductor 22 | 52 millihenries |
| Inductor 66 | 30 millihenries |
| Tube 15 | 6J6 |
| Voltage across 57 | 135 volts |
| Voltage across 59 | 15 volts |
| Bridge input voltage | 100 volts (approx.) |

*Operation*

The operation of my circuit will now be described. Inductor 32 and capacitors 44 and 45 are so chosen that tank circuit 29 has a selected natural frequency: then if the oscillation takes place it will be at this frequency. I prefer to use an oscillator having a frequency of 100 kilocycles. Inductors 20 and 21 are selected to have equal impedance at this frequency, and also to have equal numbers of turns, so that terminal 26 is actually the electrical midpoint of the inductors: capacitors 22 and 23 are also chosen to have equal impedances and power factors at the selected frequency, in the absence of ice accretion on pick-up capacitor 22. The power frequency supplied to primary winding 55 is known, and capacitors 44, 45, 51, 75, 96, and 98 are chosen to have a high impedance to current at this frequency, while having a reasonably low impedance to current of the selected high frequency. Resistor 94 has a high resistance to prevent appreciable flow of high frequency current to the cathode of triode 34 through winding 91, ground connections 69 and 47, and resistor 48. If switch 62 has remained closed for some time, the system as shown in Figure 1 has come to thermal and mechanical equilibrium.

Now consider an instant in the cycle of the power source where its magnitude is zero: under these conditions no anode potential is provided for triodes 33 and 34. Accordingly, oscillator 11 does not operate, there is no input to or output from bridge 10, and there is no output current fom triode 34. As the potential of the source increases, secondary winding 57 receives an induced potential such that its upper terminal 64 is positive. Plates 35 and 36 of triodes 33 and 34 therefore receive increasingly positive charges, and triode 33 breaks into oscillation at the selected frequency. Oscillation continues throughout each half cycle of the plate voltage during which the plate is positive and is suppressed during each half cycle during which the plate is negative, and takes the form of a high frequency current flowing from plate to ground through capacitor 44 and through a series circuit including inductor 32 and capacitor 45.

The high frequency current through capacitor 45 results in a potential difference thereacross which is impressed upon the grid circuit of triode 33, in the usual 180 degree phase relationship with the high frequency plate voltage, so that oscillation is built up, during positive half cycles of the power supply, according to conventional oscillator practice. This oscillation is at the selected high frequency, but instead of alternating about a linear value determined by the conventional unidirectional plate voltage, it alternates about a value which itself varies trigonometrically with the low frequency plate voltage.

Since the mutual conductance of the tube also varies, altmost linearly, with the plate potential, the amplitude of the high frequency alternating current also varies with the instantaneous value of the plate potential, and the envelope of the complex wave during the positive half cycle of the plate voltage is substantially comprehended between the axis of zero voltage and a sinusoidally varying upper limit. Thus, in Figure 4, if the straight line 100 is the axis of cathode potential, then curve 101 is the plate potential on triode 33, and the feedback voltage impressed on grid 37 of triode 33 is as suggested by curve 102: its magnitude is zero during the negative half cycle of the power supply. This voltage, which I shall call the first signal voltage, is impressed on the grid circuit of triode 34, through capacitor 98, in such a fashion as tends to drive the grid 40 positive according to a wave form corresponding to curve 102.

As previously explained, by reason of the connection from the grid of triode 34 to potential divider 91, there is provided a variable grid bias voltage for triode 34 of the power frequency but of phase opposite to that of the low frequency plate voltage, and therefore of phase opposite to the envelope of the high frequency voltage supplied through condenser 98. The bias voltage is of any desired amplitude within the limits set by the relation between the numbers of turns in the plate and grid portions of winding 57. The envelope of the first signal voltage, as I have previously stated, is substantially sinusoidal: therefore, by suitably adjusting potential divider 90, it is possible within practical limits to impress upon grid 40 a bias voltage which is at all times just sufficient to reduce the plate current of the triode to zero.

In the practice of my invention, however, I prefer to permit a certain minimum plate current to flow, and for this reason I adjust potential divided 90 so that the amplitude of the negative bias voltage, which I have indicated by curve 103 in Figure 4, is always slightly less numerically than that required to cut off the discharge of the tube at the various values taken by the envelope of the first signal voltage, and a small plate current flows in the form of a half wave unidirectional pulsating current of small average magnitude. Meter 74 is designed for operation on direct current, and is incapable of following the wave form of the individual pulses. Since the pulsating current is unidirectional, however, it has an average value which remains constant in the absence of other signal voltages, and to this average current meter 74 is capable of responding. It therefore comes to a "zero" indication displaced from the no-current position of the indicator; the "zero" position remains constant as long as the setting of potential divider 90 and the amplitude of the high and low frequencies remain unaltered.

As a result of operation of oscillator 11, a high frequency voltage appears between terminals 18 and 19 of bridge 10, which is induced by transformer action from primary winding 32 and which therefore has the frequency and wave form of the oscillator output, shown at 102 in Figure 4. Since the inductors and capacitors in the respective arms of the bridge have been chosen to have the same impedance ratios at the selected high frequency as long as no ice forms on pick-up 22, the bridge is in balance, and there is no potential difference between terminals 24 and 26. Accordingly, no voltage from this source is impressed between the grid and cathode of triode 34 so long as the balance condition prevails. In order to understand the operation of my "phased" detection" or differential sensitivity circuit the conditions in bridge 10 must be considered in more detail.

As long as capacitors 22 and 23 are equal in reactance and have negligible conductance there is no voltage output from the bridge, no matter what the input voltage to the bridge may be. This is also true if the capacitors have leakage conductances such as to give them equal power factors at the selected high frequency, as is the case here when there is no ice on the pickup unit.

As the capacitance of capacitor 22 increases, a bridge output voltage appears between terminals 26 and 24 which is substantially 180° out of phase with that between terminals 18 and 19. If the conductance of capacitor 22 increases, a bridge output voltage appears between terminals 26 and 24 which is less than 180° out of phase with that between terminals 18 and 19. If both the capacitance and the conductance of capacitor 22 increase, the resulting bridge output voltage has a phase angle with that between terminals 18 and 19 which depends on the relative magnitudes of the two changes, and which has a first component due to the capacitance which is substantially 180° out of phase with the input voltage, and a second component due to the conductance which is substantially 90° displaced from the first component.

In the preferred embodiment of my invention inductors 20 and 21 are electrically identical and capacitors 22 and 24 are designed to have the same impedance in the absence of ice accretion on pick-up 22. The bridge therefore should be in balance under these conditions, but actually there are manufacturing tolerances and other undesired variations in the circuit elements. Accordingly, when the bridge is set up, it may not be strictly at balance, either because the voltage drops across capacitor 22 and inductor 20 are not equal in magnitude or because they are not exactly in phase. Any conventional adjusting means such for example as trimmer condensers may be used to bring about an original condition of equal voltage drop, and correct phase alignment: these adjusting members have not been shown in the drawing to avoid unnecessarily complicating the illustration.

In the operation of my device, inductors 20 and 21 and capacitor 23 remain essentially constant in impedance—that is, in reactance and resistance. The bridge voltage is therefore determined by change in the impedance of capacitor 22 due to accretion of ice and to variation in ambient temperature.

This is best shown in Figure 5, in which vector $\overline{AC}$ is proportional to the bridge output voltage, and is seen to be comprised of two components out of phase by 90 degrees, a reactive component indicated by vector $\overline{AB}$ and a resistor component indicated by vector $\overline{BC}$. It is to be anticipated that components represented by $\overline{AB}$ and $\overline{BC}$ will be of generally the same magnitude, although of course variation is to be expected in operation of the device under diverse conditions. This being the case, it is clear that change of a given magnitude in $\overline{AB}$ has the same effect on $\overline{AC}$ as does an equal change in $\overline{BC}$. Thus, $\overline{AF}$ is the vector sum of $\overline{EF}$ and $\overline{AE}$, and $\overline{AF}$ is greater than $\overline{AC}$ by $\overline{CL}$. Similarly, $\overline{AD}$ is the sum of $\overline{AB}$ and $\overline{BD}$ and $\overline{AD}$ is greater than $\overline{AC}$ also by $\overline{CL}$. This means that the unit is equally sensitive to changes in the reactance of the pickup—which are linear with ice accretion and relatively unaffected by temperature—and to changes in the resistance of the pickup—which are non-linear with ice accretion and which are affected by changes in temperature even in the absence of ice.

Since I desire to make the instrument relatively insensitive to the resistive component of the bridge output voltage, I add that voltage to a second voltage of constant amplitude and of the same phase as component $\overline{AB}$ of voltage $\overline{AC}$; this second voltage is represented by $\overline{CG}$, and is proportional to the oscillator feedback voltage. The voltage applied to grid 40 of triode 34 is the sum of $\overline{AC}$ and $\overline{CG}$, or $\overline{AG}$. A change in the value of the reactive voltage from $\overline{AB}$ to $\overline{AE}$ results in a change in the grid voltage from $\overline{AG}$ to $\overline{AJ}$ and the change in magnitude of $\overline{AG}$ corresponding to a change $\overline{BE}$ in $\overline{AB}$ is $\overline{GN}$. On the other hand, a change of the value of the resistive voltage from $\overline{BC}$ to $\overline{BD}$ results in a change in the grid voltage from $\overline{AG}$ to $\overline{AH}$, and the change in magnitude of $\overline{AG}$ corresponding to a change $\overline{CD}$ in $\overline{BC}$ is $\overline{GM}$.

$\overline{GN}$ is much larger than $\overline{GM}$; that is, the instrument is now much more sensitive to change in reactive voltage than to change in resistive voltage, and the effect of temperature and non-linear change in conductance with ice accretion is minimized.

It will also be apparent that while $\overline{GN}$ is greater than $\overline{GM}$, the ratio $\overline{GN}/\overline{AG}$ is much smaller than the ratio $\overline{CL}/\overline{AC}$. It is therefore impossible to increase the sensitivity ratio of my circuit without limit, because the overall sensitivity of the circuit drops off to a point where, though the sensitivity ratio is still improved, the total signal is so small as to be impractical. I have found a value for $\overline{CG}$ somewhat larger than $\overline{AC}$ but of the same general magnitude to be most satisfactory for operation in practical ranges of the device.

The method of insuring that vectors $\overline{CG}$ and $\overline{AB}$ are in the proper phase relation remains to be explained. As previously pointed out, the voltage between terminals 24 and 26, in its phase relation to the input voltage between terminals 18 and 19, is determined by the capacitance and resistance of pickup unit 22. However, by varying resistor 30 a phase shift is made possible in the output voltage referred to, and in setting up the apparatus this resistor is adjusted, and the values of capacitors 44, 45, 51, and 28, as well as the connections to the transformer windings, are so chosen that in the event of a purely capacitive change in the pickup the bridge output voltage would be in phase with the oscillator feed back voltage. By this means the voltage phase relations are so arranged that vectors $\overline{AB}$ and $\overline{CG}$ have the same direction, and the above described cooperation between the voltages is now free to take place. The phase of the low frequency voltage is in no way affected by this adjustment.

Before continuing with the operation of the circuit, it should be pointed out that for the sake of simplifying the discussion, voltages proportional to the bridge and oscillator outputs have been referred to in describing vectors $\overline{AB}$, $\overline{AC}$, $\overline{BC}$, $\overline{CG}$, and $\overline{EG}$. Reference to Figure 1, however, will show that in fact vector $\overline{AC}$ is really the difference between the bridge output voltage and the IZ drop in capacitor 96. Similarly, vector $\overline{CG}$ is the difference between the oscillator voltage and the IZ drop in condenser 98. It can be shown that the relative magnitudes of these voltages are inversely proportional to the capacitances of the associated capacitors, but the latter are fixed in value, as indicated above, and the vector diagram may properly be used to indicate the nature rather than the actual magnitude of the voltage relationships.

Plate current flows in triode 34 in accordance with the plate and grid voltages on the tube. The plate voltage is in phase with the envelopes both of the first signal voltage and of the bridge voltage, and is of opposite phase to the grid bias voltage which substantially neutralizes the first signal voltage. Accordingly, the tube is controlled principally by the bridge voltage $E_x$, and during each positive half cycle of plate voltage plate current flows having a wave form generally the same as that shown by curve 102 in Figure 4, although on a different set of coordinates. Meter 74 takes a position corresponding to the average value of current during the conducting and non-conducting half cycles, and the reading increases and decreases in accordance with increase and decrease in the bridge unbalance, principally that due to changes in $X_2$ and only to a minor extent to that due to changes in $R_2$.

The manner in which my invention is designed to operate is now apparent. So long as the system is in operation and the surface on which pick-up capacitor 22 is mounted is free from ice, the grid voltage on triode 34 is comprised only of the bias voltage and the first signal voltage, and the zero current flows in the plate circuit of triode 34. If the ambient temperature diverges very widely from the value which is normal for the bridge, a slight change in the indication of meter 74 may take place, but this is generally of negligible magnitude.

If ice begins to form on pick-up 22, its reactance and its resistance both change, so that a bridge voltage is impressed on the grid circuit of triode 34 which is of a magnitude depending principally on the change in capacitance brought about by the ice accretion and having a negligible component due to the change in the resistance of the capacitor. This voltage combines with the first signal voltage to give a resultant voltage (vector $\overline{AG}$ in Figure 5) whose magnitude and phase depend on the magnitude of the first signal voltage and the bridge voltage. Under the influence of the positive plate voltage and this resultant grid voltage, plate current flows through triode 34 and is indicated on meter 74. An increase in the amount of ice on the pick-up 22 results in an increase in the meter reading, and a decrease in the ice formation likewise results in a decreased meter reading.

Movement of the craft through areas of temperature variation has no appreciable effect on the capacitance of condenser 22 and therefore on the principal component of the bridge voltage influencing the plate current in triode 34. The variation in temperature, however, does have a significant effect on the resistive component of the impedance of pickup 22 and therefore varies the angle between vectors CG and $\overline{AC}$. Since the magnitude of vector AB remains essentially constant, however, and since the variation in magnitude of vector $\overline{BC}$ is not large compared to $\overline{BC}$ itself, there results only a relatively small variation in the value of vector $\overline{AG}$ which is a measure of the voltage influencing indicator 74.

Numerous objects and advantages of my invention have been set forth in the foregoing description together with details of the structure and function of the invention, and the novel features thereof are pointed out in the appended claims. The disclosure, however, is illustrative only, and I may make changes in detail, especially in matter of shape, size, and arrangements of parts, within the principle of the invention, to the full extent indicated by the broad general meaning of the terms in which the appended claims are expressed.

I claim as my invention:

1. In a device of the class described, in combination: a low frequency source of alternating voltage; a normally balanced electric bridge effective upon unbalance to supply an unbalance alternating voltage having first and second components of variable amplitude in phase quadrature; means, including a high frequency source of alternating voltage, for normally energizing said bridge; an electron discharge device including means for controlling the discharge thereof; a current responsive member to be actuated in accordance with the magnitude of the first of said components; an output circuit for said device, including said member and said low frequency source, said output circuit providing electrical energization and an external path for said controlled discharge, so that said member may respond to a characteristic of the current comprising said discharge; and input circuit means for energizing said device from said bridge in such a fashion as to minimize the effect of said second component; said input circuit means including means severally applying to said discharge controlling means alternating potentials derived from said high frequency source and from said bridge, and means adjusting the phase of the high frequency unbalance voltage supplied by said bridge so that said first component thereof is in phase with the voltage from said second source, so that the characteristic of said discharge is determined by the instantaneous sum of said potentials, thus minimizing the effect on said discharge of said second quadrature component.

2. In a device of the class described, in combination: a low frequency source of alternating voltage; a normally balanced electric bridge effective upon unbalance to supply an unbalance alternating voltage having first and second components of variable amplitude in phase quadrature; means, including a high frequency source of alternating voltage, for normally energizing said bridge; an electron discharge device including means for controlling the discharge thereof; a current responsive member to be actuated in accordance with the magnitude of the first of said components; an output circuit for said device, including said member and said low frequency source, said output circuit providing electrical energization and an external path for said controlled discharge, so that said member may respond to the magnitude of the current comprising said discharge; and input circuit means for energizing said device from said bridge in such a fashion as to minimize the effect of said second component, said input circuit means including means severally applying to said discharge controlling means alternating potentials derived from said source high frequency and from said bridge, and means adjusting the phase of the high frequency unbalance voltage supplied by said bridge so that said first component thereof is in phase with the voltage from said second source, so that the magnitude of said discharge is determined by the instantaneous sum of said potentials, thus minimizing the effect on said discharge of said second quadrature component.

3. In a device of the class described, in combination; an electron discharge device having an output circuit and input circuit means including means for controlling the discharge of said device; a first source of alternating voltage, of a power frequency; a second source of alternating voltage having power and carrier frequency components; and means connecting said first source in a selected phase relationship in said output circuit of said discharge device; said input circuit means comprising first means impressing on said control means of said discharge device a first fixed-phase alternating potential of said power frequency displaced by 180° from said selected phase relationship, second means impressing on said control means of said discharge device a second alternating potential from said second source having the power frequency component thereof being of said selected phase relationship, third means impressing on said control means of said discharge device a third, variable alternating potential having two components of said carrier frequency in quadrature, and means adjusting the phase of said third potential so that one of said quadrature components thereof is in phase with the carrier frequency component of said second voltage.

4. In a device of the class described, in combination: an electron discharge device having an output circuit and input circuit means including means for controlling the discharge of said device; a first source of alternating voltage of a power frequency; and means, including means responsive to a characteristic of the discharge of said device, connecting said source in a selected phase relationship in said output circuit of said discharge device; said input circuit means comprising first means impressing on said control means of said discharge device a first fixed-phase alternating potential of said power frequency displaced by 180° from said selected phase relationship, second means impressing on said control means of said discharge device a second alternating potential having a carrier frequency component and a power frequency component, said power frequency component being of said selected phase relationship, third means impressing on said control means of said discharge device a third, variable alternating potential having components of said carrier frequency and said power frequency, further means for initially adjusting the phase of said carrier component of said third potential to a desired relation with the carrier component of said second potential, said third means including condition responsive means for varying the amplitude and phase of said carrier component of said third potential as compared to said carrier component of said second potential.

5. In a device of the class described, in combination: an electron discharge device including means for controlling the discharge thereof; means generating an alternating potential of a carrier frequency modulated at a power frequency; first and second means connecting said generator to said control means of said discharge device, said first means including means electrically responsive to change in a condition to vary the amplitude and phase of the generator potential impressed therethrough upon said control means, so that the potential supplied thereby to said control means comprises a carrier signal of fixed frequency and responsively variable amplitude and time-phase relation; means for initially adjusting the phase of said carrier component of said first named potential to coincide with the carrier component of said second potential current responsive means; means, including said current responsive means, energizing said discharge device at said power frequency for causing discharge thereof, so that said responsive means may be actuated in response to a characteristic of the current due to said discharge; and means impressing a bias potential upon said control means for normally inhibiting said discharge during a portion of each cycle of said power frequency.

6. In a device of the class described, in combination: an electron discharge device having an output circuit and input circuit means including means for controlling the discharge of said device; a first source of alternating voltage of a power frequency; means energizing the discharge circuit and the control circuit of said device with alternating voltages of opposite phase to provide a bias; and means, including means responsive to a characteristic of the discharge of said device, connecting said source in a selected phase relationship in said output circuit of said device; said input circuit means comprising first means impressing on said control means of said discharge device an alternating potential having a carrier frequency component and a power frequency component, said power frequency component being of said selected phase relationship, condition responsive means impressing on said control means of said discharge device a variable alternating potential having components of said carrier frequency and said power frequency, and means for initially adjusting the phase of said carrier component of said variable potential to a desired relation with the carrier component of said second potential.

7. In a device of the class described, in combination: a first source of alternating voltage of a selected frequency; a second source of alternating voltage of said frequency having first and second components of variable relative amplitude in phase quadrature; an electron discharge device including means for controlling the discharge thereof; an output circuit for said device; a current responsive member to be actuated in accordance with the amplitude of said first component of the voltage from said second source; means connecting said current responsive means in said output circuit; means applying voltage from said first source to said discharge control means; means independently applying voltage from said second source to said discharge control means; and means adjusting the phase of said second voltage so that said first component thereof is in phase with the voltage from said first source.

RICHARD M. FRANZEL.

REFERENCES CITED

The following references are of record in the file of this patent:

UNITED STATES PATENTS

| Number | Name | Date |
|---|---|---|
| 2,237,254 | Broekhuysen | Apr. 1, 1941 |
| 2,290,771 | Shepard, Jr. | July 21, 1942 |
| 2,316,875 | Laboulais | Apr. 20, 1943 |
| 2,419,266 | Kliever et al. | Apr. 22, 1947 |
| 2,423,864 | Washburn et al. | July 15, 1947 |
| 2,432,669 | Kliever | Dec. 16, 1947 |

FOREIGN PATENTS

| Number | Country | Date |
|---|---|---|
| 609,661 | Germany | Feb. 19, 1935 |

Certificate of Correction

Patent No. 2,531,265 November 21, 1950

RICHARD M. FRANZEL

It is hereby certified that error appears in the printed specification of the above numbered patent requiring correction as follows:

Column 3, line 72, for "industance" read *inductance*; column 4, line 56, for "cathodes" read *cathode*; column 7, line 54, for "divided" read *divider*; column 8, line 16, after "phased" strike out the closing quotation mark;

and that the said Letters Patent should be read as corrected above, so that the same may conform to the record of the case in the Patent Office.

Signed and sealed this 13th day of March, A. D. 1951.

[SEAL]

THOMAS F. MURPHY,
*Assistant Commissioner of Patents.*